(12) United States Patent
Solheim et al.

(10) Patent No.: US 12,377,327 B2
(45) Date of Patent: Aug. 5, 2025

(54) TAPERED GRIP AND METHOD OF INSTALLING A TAPERED GRIP

(71) Applicant: KARSTEN MANUFACTURING CORPORATION, Phoenix, AZ (US)

(72) Inventors: John A. Solheim, Phoenix, AZ (US); Roger J. Kleber, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 16/455,565

(22) Filed: Jun. 27, 2019

(65) Prior Publication Data

US 2019/0314693 A1    Oct. 17, 2019

Related U.S. Application Data

(62) Division of application No. 15/948,758, filed on Apr. 9, 2018, now Pat. No. 10,376,762.

(Continued)

(51) Int. Cl.
*A63B 60/14*    (2015.01)
*A01B 1/02*    (2006.01)
(Continued)

(52) U.S. Cl.
CPC .............. *A63B 60/14* (2015.10); *A01K 87/08* (2013.01); *A63B 21/4035* (2015.10);
(Continued)

(58) Field of Classification Search
CPC ..... A63B 60/14; A63B 21/4035; A63B 53/14; A63B 2102/02; A63B 23/0211;
(Continued)

(56) References Cited

U.S. PATENT DOCUMENTS

| | | | |
|---|---|---|---|
| 740,500 A | * | 10/1903 | White .................... A63B 60/22 473/298 |
| 2,171,382 A | * | 8/1939 | Wettlaufer ............. A63B 60/14 473/302 |

(Continued)

FOREIGN PATENT DOCUMENTS

| | | | | |
|---|---|---|---|---|
| DE | 3343379 | | 6/1985 | |
| GB | 1128072 | | 9/1968 | |
| GB | 2520180 A | * | 5/2015 | ............. A63B 49/08 |

OTHER PUBLICATIONS

Golf WRX Forums, "Adding wrap to lower half of grip to remove taper" (https://forums.golfwrx.com/topic/616998-adding-wrap-to-lower-half-of-grip-to-remove-taper/), 2011 (Year: 2011).*

(Continued)

*Primary Examiner* — Jeffrey S Vanderveen

(57) ABSTRACT

Disclosed herein is a grip comprising an internal bore with an opening having an internal tapered edge. The grip can engage with a tool or a piece of sports equipment. Further disclosed herein is a method of installing a grip onto a tool or piece of sports equipment, including providing a grip having a tubular body; grinding an open first end of the body, wherein the open first end comprises a greatest diameter closest to the exterior of the bore and tapers internally at an angle towards the interior of the bore; providing a shaft or handle; applying an adhesive to a top portion of the handle; sliding the handle into the grip bore until the shaft contacts the a capped second end of the grip; and coupling a surface of the bore to the handle by allowing the adhesive to dry.

11 Claims, 10 Drawing Sheets

Related U.S. Application Data

(60) Provisional application No. 62/483,243, filed on Apr. 7, 2017.

(51) Int. Cl.

| | | |
|---|---|---|
| *A01K 87/08* | (2006.01) | |
| *A63B 21/00* | (2006.01) | |
| *A63B 21/22* | (2006.01) | |
| *A63B 22/20* | (2006.01) | |
| *A63B 23/02* | (2006.01) | |
| *A63B 53/14* | (2015.01) | |
| *A63B 102/02* | (2015.01) | |
| *A63B 102/22* | (2015.01) | |
| *A63B 102/24* | (2015.01) | |
| *A63B 102/32* | (2015.01) | |
| *B25B 7/00* | (2006.01) | |
| *B25D 1/00* | (2006.01) | |
| *B25G 1/10* | (2006.01) | |
| *B25G 3/34* | (2006.01) | |
| *B62K 21/26* | (2006.01) | |

(52) U.S. Cl.
CPC .............. *A63B 53/14* (2013.01); *B25G 1/102* (2013.01); *B25G 3/34* (2013.01); *B62K 21/26* (2013.01); *A01B 1/02* (2013.01); *A63B 21/0004* (2013.01); *A63B 21/22* (2013.01); *A63B 22/20* (2013.01); *A63B 23/0211* (2013.01); *A63B 2102/02* (2015.10); *A63B 2102/22* (2015.10); *A63B 2102/24* (2015.10); *A63B 2102/32* (2015.10); *A63B 2208/0219* (2013.01); *A63B 2209/00* (2013.01); *A63B 2209/10* (2013.01); *B25B 7/00* (2013.01); *B25D 1/00* (2013.01)

(58) Field of Classification Search
CPC ........ A63B 2209/00; A63B 2208/0219; A63B 2102/22; A63B 2102/24; A63B 21/0004; A63B 22/20; A63B 21/22; A63B 2209/10; A63B 2102/32; A63B 60/06; B62K 21/26; A01K 87/08; B25G 3/34; B25G 1/102; A01B 1/02; B25B 7/00; B25D 1/00

See application file for complete search history.

(56) References Cited

U.S. PATENT DOCUMENTS

| | | | |
|---|---|---|---|
| 3,318,602 A * | 5/1967 | Kunihisa | A63B 69/3632 |
| | | | 473/232 |
| 4,068,364 A | 1/1978 | Tharp et al. | |
| 5,058,891 A * | 10/1991 | Takeuchi | A63B 53/14 |
| | | | 473/201 |
| 5,322,290 A * | 6/1994 | Minami | A63B 53/14 |
| | | | 473/201 |
| 5,513,845 A | 5/1996 | Sonagere | |
| 5,686,158 A * | 11/1997 | Gibbon | A63B 60/08 |
| | | | 428/405 |
| 5,749,792 A * | 5/1998 | Engfer | A63B 53/14 |
| | | | 473/300 |
| 5,855,525 A * | 1/1999 | Turner | A63B 53/007 |
| | | | 473/300 |
| 6,401,321 B2 | 6/2002 | Carey et al. | |
| 6,485,211 B1 * | 11/2002 | Leo | B43K 23/008 |
| | | | 16/421 |
| 6,626,768 B2 | 9/2003 | Roelke | |
| 6,666,777 B1 | 12/2003 | Lamkin et al. | |
| 7,927,236 B2 | 4/2011 | Brunton et al. | |
| 8,371,956 B2 | 2/2013 | Walls | |
| 8,932,145 B2 * | 1/2015 | Hachiro | A63B 60/48 |
| | | | 473/300 |
| 9,022,878 B2 | 5/2015 | Solhaug | |
| 9,174,104 B1 * | 11/2015 | Rogacki | A63B 53/007 |
| 9,889,357 B2 | 2/2018 | Barker et al. | |
| 2002/0147056 A1 * | 10/2002 | Sukenik | A63B 53/14 |
| | | | 473/300 |
| 2003/0176577 A1 | 9/2003 | Sano | |
| 2005/0055801 A1 | 3/2005 | Chang | |
| 2009/0051211 A1 | 2/2009 | Hall et al. | |
| 2010/0065339 A1 | 3/2010 | Hall et al. | |
| 2010/0273568 A1 | 10/2010 | Huang | |
| 2014/0378242 A1 | 12/2014 | Chalifoux | |
| 2017/0216995 A1 | 8/2017 | Schulze | |
| 2017/0354132 A1 | 12/2017 | Huang | |
| 2018/0154227 A1 * | 6/2018 | Barker | A63B 60/14 |

OTHER PUBLICATIONS

Golf Pride Grips, "How to Regrip a Golf Club | Golf Pride," posted May 14, 2013, www.youtube.com/watch?v=M1N6KIxE3iY (Year: 2013).*

* cited by examiner

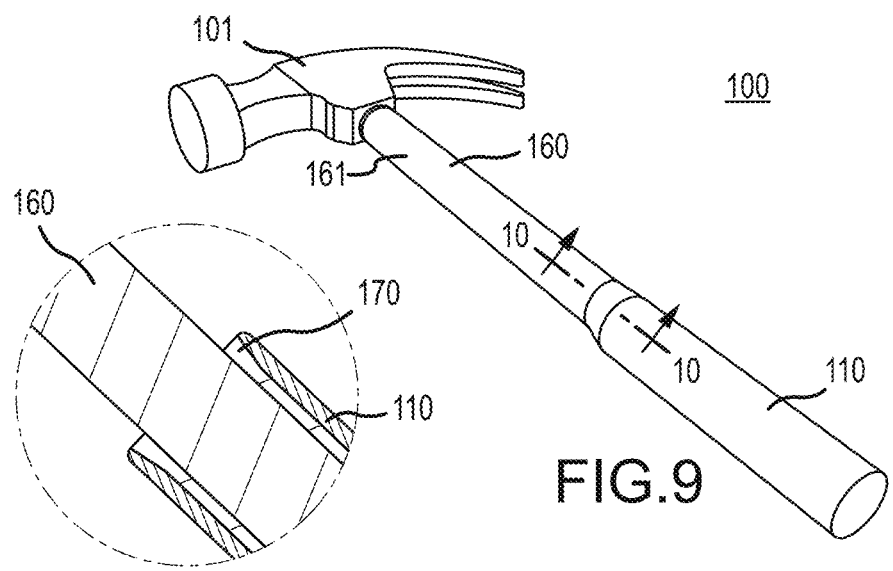
FIG.9
FIG.10
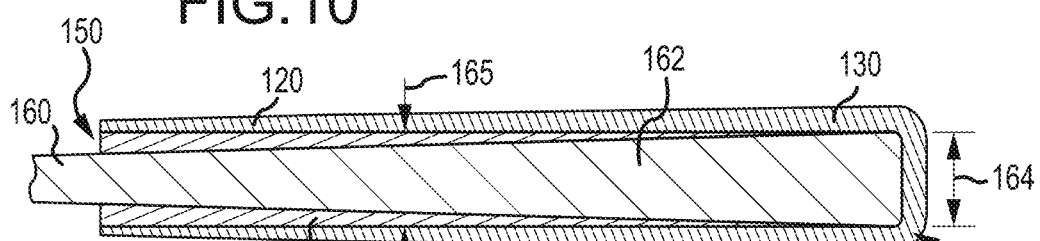
FIG.11
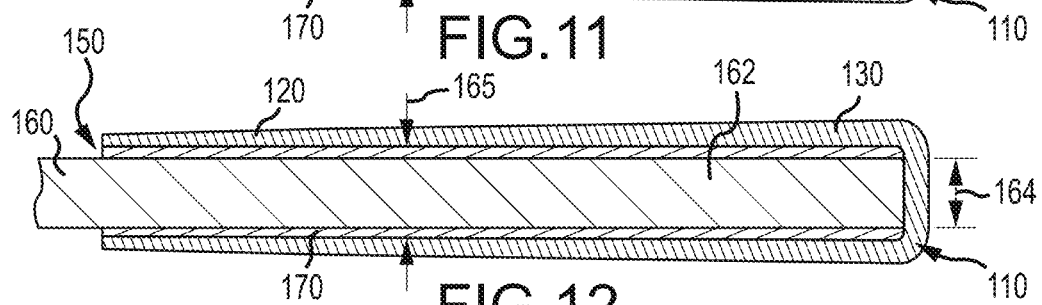
FIG.12
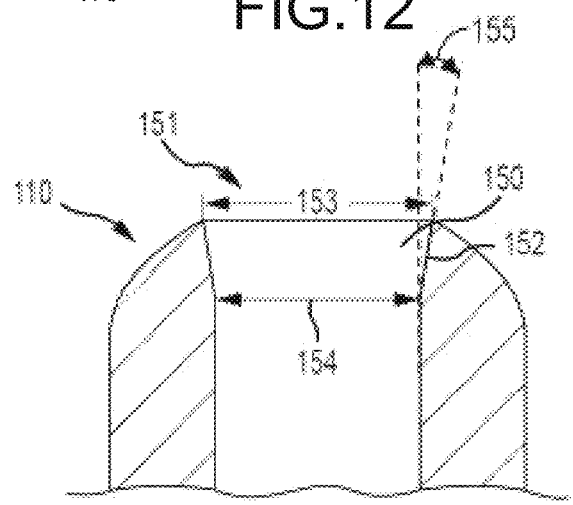
FIG.13

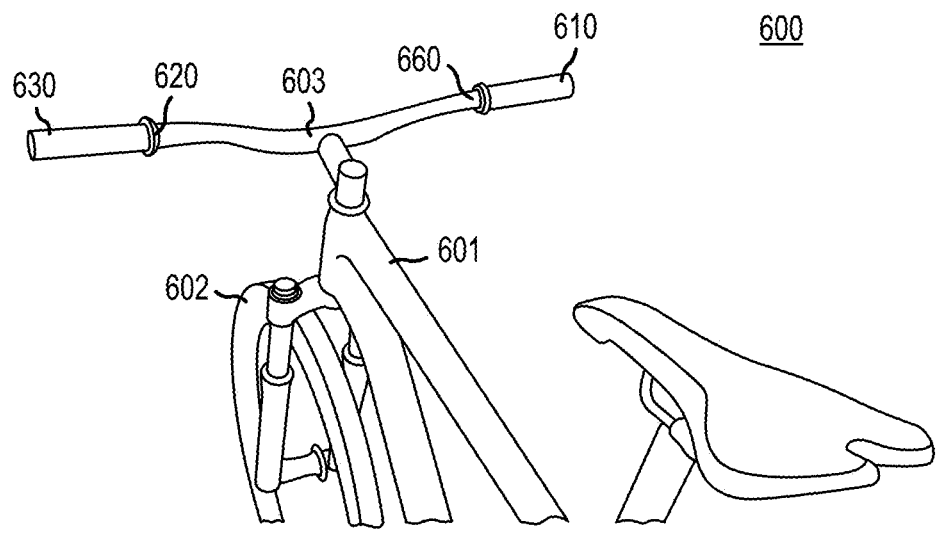
FIG.23
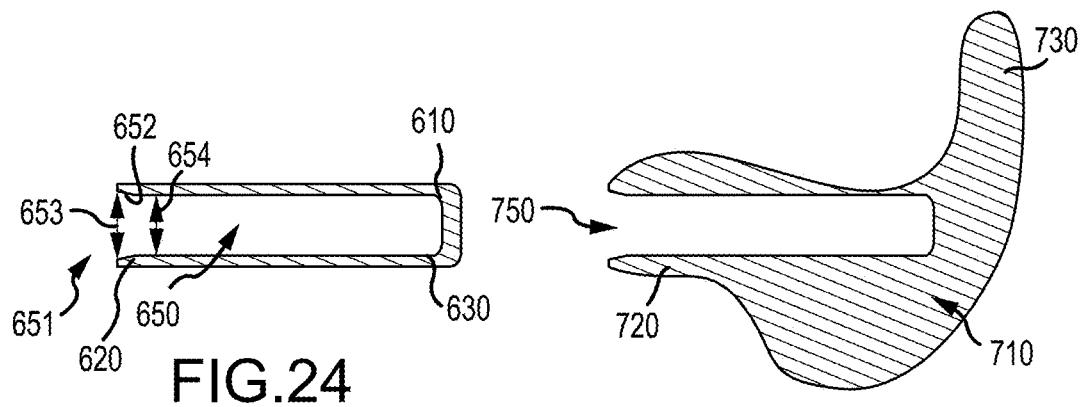
FIG.24
FIG.25
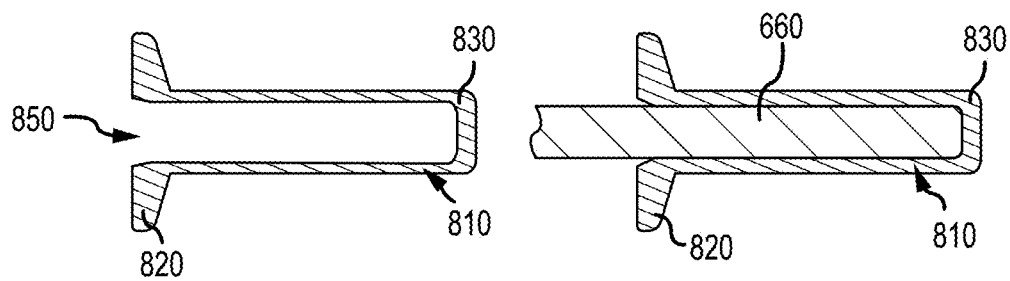
FIG.26
FIG.27

TAPERED GRIP AND METHOD OF INSTALLING A TAPERED GRIP

CROSS REFERENCE

This is a divisional of U.S. patent application Ser. No. 15/948,758, filed on Apr. 9, 2018, which claims the priority of U.S. Provisional Patent Appl. No. 62/483,243, filed on Apr. 7, 2017, the contents of all of which are incorporated fully herein by reference in its entirety.

FIELD OF THE INVENTION

The present disclosure relates to tapered grip and to a method of installing the tapered grip to a device, wherein the method allows for greater adhesion between the grip and the handle or shaft of the device, reducing the possibility of shifting.

BACKGROUND

Grips are used on many products to improve the ability of a user to hold onto an device, such as a tool or a piece of sports equipment. The background provided below is regarding golf clubs and golf club grips, which is one field in which the tapered grip can be implemented.

Golf clubs take various forms, for example a wood, a hybrid, an iron, a wedge, or a putter. Each golf club includes a shaft having a top portion configured to receive a grip and a bottom portion configured to receive a club head.

Generally, the grip is coupled to the shaft using an adhesive. More specifically, the grip can be coupled using double-sided tape, wherein a first side is coupled to the shaft and the second side is configured to couple to a bore within the grip. The adhesive on the second side of the tape ensures that the grip will not shift after being installed on the shaft.

It is important that the diameter of the bore within the grip and the outer diameter of the tape be extremely similar. The smaller the difference between the diameter of the bore and the outer diameter of the tape the more affective the adhesive is in securing the grip to the shaft. However, in many grips, the opening of the bore includes a sharp edge (flashing) due to manufacturing processes.

Installing the grip on the shaft includes sliding the shaft comprising the double sided tape into the bore of the grip. The sharp edge on the opening of the bore along with the tight tolerance between the diameter of the bore and the outer diameter of the tape can cause the adhesive to be stripped from the tape during installation. This can result in the grip undergoing unwanted shifting or rotation during use.

While golf club grips have a variety of known designs, there is a need for a grip which can be installed on a shaft without stripping away adhesive which has to be applied to secure the grip to the shaft.

BRIEF DESCRIPTION OF THE DRAWINGS

FIG. 9 illustrates a perspective view of a hammer with a grip.

FIG. 10 illustrates a close-up cross-section of a shaft of the hammer of FIG. 9 with grip and tape.

FIG. 11 illustrates a cross-section of a portion of the hammer of FIG. 9 with a tapered shaft and tape between the shaft and grip.

FIG. 12 illustrates a cross-section of a portion of the hammer of FIG. 9 with a constant-diameter shaft with the grip covering the shaft without tape.

FIG. 13 illustrates a cross-section of a top of the grip of FIG. 9.

FIG. 23 illustrates a perspective view of a bicycle with grips on the handlebars.

FIG. 24 illustrates a cross-section showing a taper on a regular bicycle grip.

FIG. 25 illustrates a cross-section showing a taper on an ergonomic bicycle grip.

FIG. 26 illustrates a cross-section showing a taper on a bicycle grip with end guards.

FIG. 27 illustrates a cross-section showing bicycle grip with end guards on handlebars, having constant-diameter handlebar shaft and no tape.

DETAILED DESCRIPTION

Figure 1:
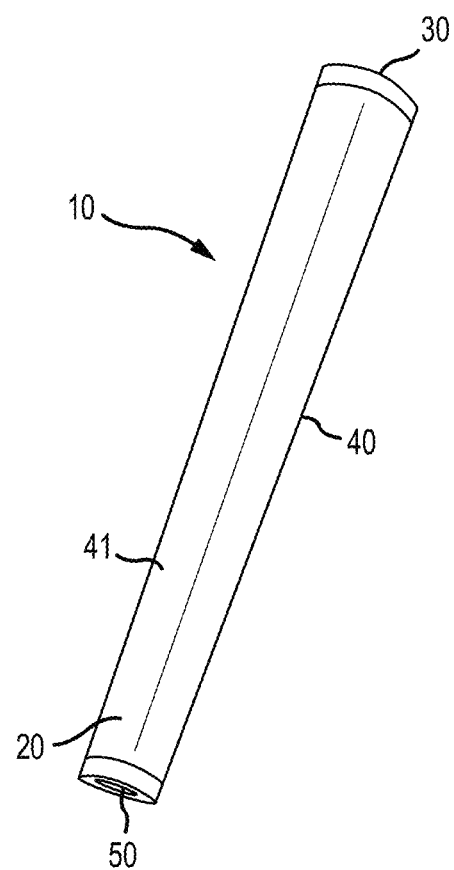
FIG. 1 illustrates a front perspective view of a grip.

Disclosed herein is a grip with an internal tapered opening, wherein the grip is intended for insertion onto a shaft or handle of a piece of equipment, such as a tool or a piece of sports equipment. Further disclosed is a method for installing one or more grips onto one or more handles of a piece of equipment. The grip comprises a bore that receives the shaft or handle of the tool or piece of equipment. In most embodiments, an adhesive is interposed between the shaft or handle and the grip. Often there is a tight tolerance between the bore of the grip and the outer surface of the handle to ensure that there is sufficient surface area contact between the grip and the handle. The tapered opening on the grip allows the grip to slide onto the shaft or handle without pushing the adhesive off the handle. When more adhesive remains interposed between the handle and the grip, the connection is more secure and the quality of the tool or piece of equipment is improved. Moreover, the process of manufacturing the tool or piece of equipment is simplified since excess adhesive does not need to be removed if the adhesive remains within the grip, as desired.

In some embodiments described herein, the shaft or handle have varying outer diameter, resulting in a tapered shaft or handle. In some embodiments, the bore of the grip can also have a varying diameter, resulting in a tapered bore. This tapered bore prevents adhesive from being pushed off the shaft. In some embodiments, a space is left between at least a portion of the grip and a portion of the shaft or handle. This space can be filled by applying an adhesive, such as double-sided tape, to the shaft or handle before installing the grip. In embodiments wherein the adhesive comprises tape, a second adhesive can be interposed between the tape and the grip to further secure the grip to the shaft or handle. In some embodiments, a solvent is applied to a shaft or handle before the grip is attached in order to allow the grip to more easily slide onto the shaft or handle.

The grip described herein can be applied to one or more handles or shafts of any type of sports equipment. For example, the grip can be used in golf clubs, fishing rods, bicycles, workout roller wheels, jumping ropes, oars, exercise equipment, and any other type of sports equipment having one or more handles with one or more grips. Exercise equipment can comprise apparatus such as ellipticals, stationary exercise bicycles, tread mills, or other gym equipment. Exemplary embodiments of a golf club, a fishing rod, a workout roller wheel, and a bicycle, as illustrated in FIGS. 1-6 and FIGS. 19-27, are described below. However, the scope of this application is not limited to the exemplary embodiments, but rather can be applied to any type of sports equipment having a handle or shaft covered with a grip.

The grip described herein can be applied to one or more handles of any type of tool. For example, the grip can be used in hammers, pliers, wrenches, screwdrivers, chisels, files, saws, shears, knives, or any type of woodworking tool, any type of metalworking tool, any handworking tool, any kitchen utensil, any camping equipment with handles, or other categories of tools. For further example, the grip can be used in gardening tools such as shovels, trowels, spades, rakes, hoes, sickles, or hedge trimmers. For further example, the grip can be used in kitchen tools or utensils such as spatulas, bottle brushes, ladles, slotted spoons, strainers, knives, whisks, pots, pans, woks, and other kitchenware with handles. Exemplary embodiments of a hammer, a wrench, and a shovel, as illustrated in FIGS. 9-18, are described below. However, the scope of this application is not limited to the exemplary tools, but rather can be applied to any type of tool handle covered with a grip.

For the purposes of the general description, the term "tool" will refer to both tool-type equipment and sports equipment. For the purposes of the general description, the term "handle" will refer to both handle-like components and shaft-like components.

The grip comprises a tubular body including an bore extending between a first end and a second end. The bore is internal to the grip. In some embodiments, the body of the grip can take on a circular shape, a square shape, a hexagonal shape, or any other suitable shape. Likewise, the bore can take on a circular, square, hexagonal, or any other suitable shape. At the first end of the grip, the bore is open to the exterior of the grip and configured to receive a handle of the tool. At the second end of the grip, the bore is capped, limiting the handle from protruding through the second end of the bore. In embodiments with a circular bore, the diameter of the bore extending through the grip is only slightly bigger than an outer diameter of the handle to ensure a secure connection. In embodiments with a square bore, the width of the bore is only slightly bigger than an outer width of the square handle to ensure a secure connection.

One or more layers of adhesive can be interposed between the grip and a portion of the handle received by the bore. The adhesive can comprise glue, cement, mucilage, paste, tape, or any other suitable adhesive. In some embodiments, the adhesive can comprise double-side tape. As described in detail below with regard to a golf club embodiment, the tape can be coupled to the shaft in layers. In some embodiments, the adhesive consists of multiple types of adhesive.

Due to the manufacturing process a front edge on the open first end of the bore can include a sharp first end, referred to in the industry as "flashing." Flashing is the excess material attached to the grip during the molding or casting process used to form the grip. Generally, the flashing is created due to leakage of the material between the two surfaces of a mold or between the base material and the mold. The grip is installed on the handle by sliding the handle into the bore such that a top portion of the handle is in contact or near the capped second end. The flashing on the first edge of the grip can increase the friction between the two surfaces resulting in the adhesive being stripped from the handle during the installation process. To ease the installation process, the flashing on the internal first edge of the opening of the grip can be filed, or grinded, or tapered using a conical tool, creating an internal tapered front edge in a direction extending generally from the first end of the grip to the second end of the grip. In embodiments with non-circular grips and handles, the flashing can be partially removed using a conical tool, or the flashing can be partially or fully removed via filing or grinding. This process of removing the flashing at the end of the grip can also create a tapered opening on the first end of the grip.

The tight tolerance between the diameter or width of the bore and the respective diameter or width of the handle, along with the flashing on the internal, front edge of the opening, can result in the adhesive applied to the handle being stripped or removed as the grip is installed on the handle. This can result in the grip not being properly secured to the handle and as such the grip can experience unwanted shifting or rotation. The tapered opening on the first end of the internal bore can allow the grip to be slid onto the handle without stripping or removing any of the adhesive applied to the handle. By preserving the dispersion of the adhesive along the handle, the surface area of the connection between the handle and the grip is maximized. The adhesive secures the grip to the handle and prevents any unwanted shifting or rotation.

Depending on the type and size of the tool, the one or more handles can comprise various sizes and shapes. Additionally, the one or more grips that couple to the handles can comprise various sizes and shapes. In tools with cylindrical handles, the diameter of each handle can increase, decrease, or remain constant across a length of the handle. Similarly, in embodiments with a circular grip, the bore can have a diameter which increases, decreases or remains constant across its length. In tools with rectangular handles, the width and height dimensions of each handle can increase, decrease, or remain constant across the length of the handle. Similarly, in embodiments with a rectangular-shaped grip, the dimensions of the bore can increase, decrease, or remain constant across its length. In embodiments with a square-shaped grip, the width of the bore can increase, decrease, or remain constant across its length. In other embodiments with a non-circular grip, the size of the bore can increase, decrease, or remain constant across its length. Generally, the shape of the bore of the tool's grip corresponds to the shape and size of the handle.

In some embodiments, the first end, second end, and tubular body of the grip can comprise the same material and can be formed integrally with each other. In other embodiments, the first end, second end and tubular body can be formed separately and then coupled together. In some embodiments, the tubular body can comprise a separate outer layer comprised of a different material than the tubular body. For example, in some embodiments, the separate outer layer can comprise leather, polyurethane, rubber, synthetic rubber, plastic, thermo-plastic or any other suitable material. Other suitable materials can include materials with a high coefficient of static friction. This high coefficient of friction reduces the likelihood of the tool slipping out of a user's hand. Consequently, the separate outer layer can act as a safety feature of the tool. Additionally, the separate outer layer can serve as an aesthetic addition to the tool. In some embodiments, the separate outer layer comprises an insignia.

GOLF CLUB EMBODIMENT

Illustrated in FIG. 1 is a golf club grip 10 comprising a bore 50 with internal, angled front wall at the bore opening for receiving a shaft. The golf club grip 10 comprises a first end 20 and a second end 30 and a tubular body 40 extending between the first end 20 and the second end 30. The first end 20, second end 30, and tubular body 40 can comprise the same material and can be formed integrally with each other. In other embodiments, the first end 20, second end 30 and tubular body 40 can be formed separately and then coupled together. Further, the internal bore 50 can extend from the first end 20 to near the second end 30, resulting in the grip 10 having a first end 20 which is open to the exterior and a hollow tubular body 40 extending from the open first end 20 to a capped second end 30. In the illustrated embodiment, the bore 50 of the grip 10 has a varying diameter across a portion of the length bore 50 adjacent the first end 20 and a constant diameter across the remaining length of the bore 50. In other embodiments, the remaining length of the bore 50, not including the portion of the bore 50 having an internal angled front edge adjacent the first end 20, can have a diameter which increases, decreases or remains constant across its length. In some embodiments, the tubular body 40 can comprise a separate outer layer 41 comprised of a different material than the tubular body 40. For example, in some embodiments, the separate outer layer can comprise leather, polyurethane, rubber, synthetic rubber, plastic, thermo-plastic or any other suitable material.

Figure 2:
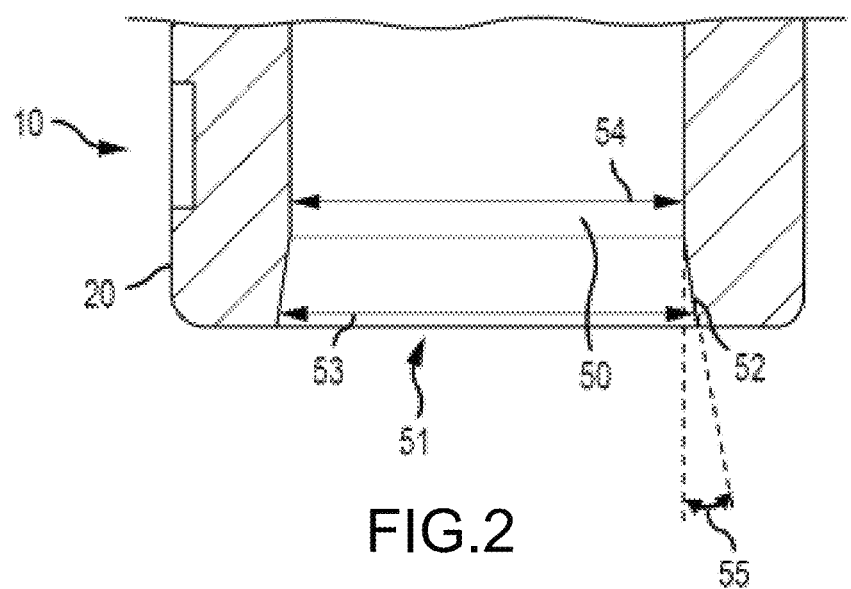
FIG. 2 illustrates a cross-sectional view of the front portion of the grip of FIG. 1.

Referring now to FIG. 2, the first end 20 of the grip 10 is illustrated. The bore 50 extends entirely through the first end 20 creating an opening 51 from the exterior of the grip into the bore 50, to the hollow tubular body 40. The opening 51 includes an internal front edge 52 which can be angled in a direction from the first end 20 towards the second end 30. The internal front edge 52 forms a tapered section of the bore 50 for receiving a shaft.

The front edge 52 of the grip 10, in the illustrated embodiment, is tapered from a first diameter 53 of 0.536 inches to a second diameter 54 of 0.530 inches along a distance of 0.125 inches. In some embodiments, the first diameter 53 and second diameter 54 can be within the range of 0.3 to 0.9 inches. In other embodiments, the first 53 and second 54 diameter can be within the range of 0.3-0.4, 0.35-0.45, 0.4-0.5, 0.45-0.55, 0.5-0.6, 0.55-0.65, 0.6-0.7, 0.65-0.75, 0.7-0.8, 0.75-0.85, or 0.8-0.9 inches. The internal front edge 52 and a portion of the bore 50 having the second diameter 54 form an angle 55.

In the illustrated embodiment, the angle 55 has a value of 3 degrees and extends for a distance of 0.125 inches in a direction generally from the front end 20 to the second end 30 of the grip 10. Further, in some embodiments, the front edge 52 angle 55 is between 0.5 and 30 degrees. In other embodiments, the front edge 52 angle 55 is between 0.5 and 3, 0.5 and 5, 1 and 5, 3 and 7, 5 and 9, 7 and 11, 9 and 13, 11 and 15, 13 and 17, 15 and 19, 17 and 21, 19 and 23, 21 and 25, 23 and 27, or 25 and 30 degrees. Additionally, in some embodiments, the angled front edge 52 can extend between 0.01 to 0.75 inches from at or near the first end 20 in a direction extending generally towards the second end 30. In other embodiments, the internal, angled front edge 52 can extend between 0.01 to 0.1, 0.05 to 0.15, 0.1 to 0.2, 0.25 to 0.35, 0.3 to 0.4, 0.35 to 0.45, 0.4 to 0.5, 0.45 to 0.55, 0.5 to 0.6, 0.55 to 0.65, 0.6 to 0.7, or 0.65 to 0.75 inches from at or near the first end 20 in a direction extending generally towards the second end 30.

Figure 3:
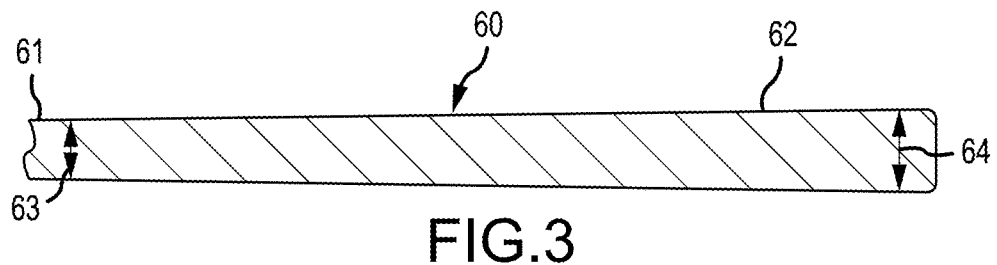
FIG. 3 illustrates a side view of a shaft.

Referring to FIG. 3, a shaft 60 of a golf club is illustrated. The shaft 60 includes a bottom portion 61 configured to couple with a golf club head (not shown) and a top portion 62 configured to be received within the bore 50 of the grip 10. The bottom portion 61 is not received within the bore 50 of the grip 10. In the illustrated embodiment, the diameter of the shaft 60 is greatest at the top portion 62 of the shaft 60, having a diameter 64 of 0.580 inches, and tapers to a smallest diameter 63 at the bottom portion 61 of the shaft 60, adjacent the club head (not shown). In other embodiments, the top portion 62 of the shaft 60 can have a greatest diameter 64 within the range of 0.510-0.540, 0.530-0.560, 0.550-0.580, 0.570-0.600, 0.590-0.620 inches. Further, the shaft 60 can have a constant diameter across the top portion 62 and begin to taper towards the bottom portion 61 after a certain length. In these embodiments, the portion of the shaft 60 that enters the grip 10 comprises a constant diameter. In other embodiments, the bottom portion 61 comprises a uniform diameter along its length from an intersection with the top portion 62 to the end of the bottom portion 61 that couples to a golf club head (not shown).

Figure 4:
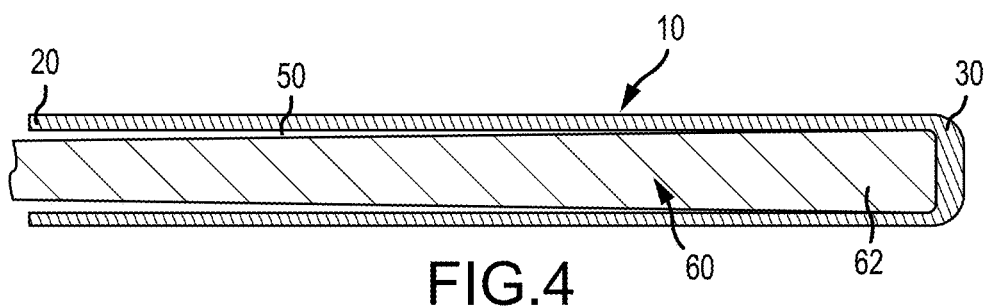
FIG. 4 illustrates a cross-sectional view of the shaft of FIG. 3 in the grip of FIG. 1.
Figure 5:
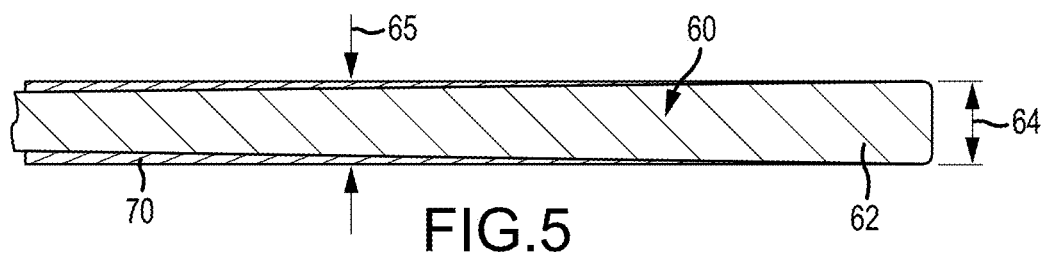
FIG. 5 illustrates a cross-sectional view of the shaft of FIG. 3 comprising tape.

In some embodiments, such as is illustrated in FIGS. 3-5, the top portion 62 of the shaft 60 which is received within the grip 10 comprises a varying diameter. The diameter of the shaft 60 adjacent the first end 20 of the grip 10 is smaller than the diameter of the shaft 60 adjacent the second end 30 of the grip 10. The diameter 64 of the shaft 60 adjacent the second end 30 of the grip 10 can be slightly less than, greater than or the same as the greatest diameter of the bore 50 within the grip 10. The tight tolerance between the two diameters ensures that the frictional forces between the shaft 60 and the bore 50 will be greater, thus forming a more secure connection after the installation process is complete. In FIG. 4, the angled front edge 52 of the bore 50 of the grip 10 at the first end 20 of the grip 10 is not shown.

Figure 6:
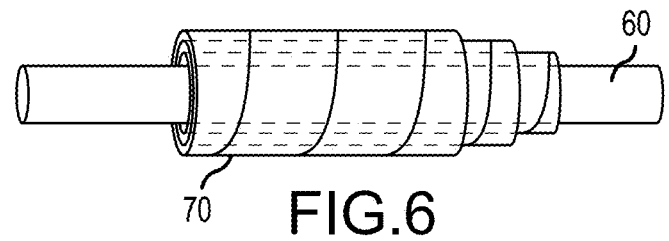
FIG. 6 illustrates a perspective view of a shaft comprising tape.

An adhesive can also be applied to the shaft 60 to aid in securing the grip 10 to the top portion 62 of the shaft 60. In many embodiments, the adhesive applied to the shaft 60 can comprise a double-sided tape 70 (FIGS. 5 and 6). The tape 70 can be applied such that, a first side of the tape 70 is coupled to the shaft 60, while a second side of the tape 70 is left exposed and configured to couple with the internal bore 50 in the grip 10. Referring again to FIG. 4, the shaft 60 is tapered while the bore 50 within the grip 10 has a constant diameter. The non-constant diameter of the shaft 60 results in the separation between the shaft 60 and the bore 50 near the front end 20 of the grip 10. The separation between the shaft 60 and the bore 50 is greater than the separation between the two surfaces near the second end 30 of the grip. The greater separation can result in the adhesive not being able to properly secure the grip 10 to the shaft 60. Therefore, to ensure the adhesive can properly secure the two components, additional layers of tape 70 can be included on the portion of the shaft 60 configured to be received within the bore 50 near the front end 20 of the grip 10. As illustrated in FIG. 5, the extra layers of tape 70 can be applied such that the diameter 65 of the shaft 60 including the tape 70 remains constant across the portion of the shaft 60 configured to be received within the bore 50 of the grip 10. In some embodiments, the shaft diameter 65 including the tape 70 across a portion of the shaft 60 is equal to the greatest shaft diameter 64 at the top portion 62 of the shaft 60. In other embodiments, the adhesive can be a glue, cement, mucilage, paste, tape, or any other suitable adhesive.

As illustrated in FIG. 6, the tape 70 can be coupled to the shaft 60 in layers. In some embodiments, a first side of a first layer of tape 70 is coupled to the shaft 60. A first side of a second layer of tape 70 can be coupled to a second, exposed side of the first layer of tape 70. A first side of a third layer of tape 70 can be coupled to a second, exposed side of the second layer of tape 70. In some embodiments, the tape 70 comprises one, two, three, four, five, six, seven, or more layers. The number of layers of tape coupled to the shaft can vary across a portion of the shaft 60 length. A second, exposed side of the outermost layer of tape couples with the interior of the bore 50 within the grip 10.

The tight tolerance between the diameter of shaft 60 (including the tape 70) and the diameter of the bore 50 can cause high friction forces making it difficult to slide the shaft 60 into the bore 50 of the grip 60. To ease the installation process of sliding the shaft 60 into the grip 10, a solvent can be applied to the tape 70 or adhesive. The solvent applied to the tape 70 can temporarily deactivate the bonding characteristics of the tape 70, lowering the frictional forces and therefore, allowing the shaft 60 to easily be slid into the grip 10. However, in some embodiments, the tight tolerance between the two diameters can result in both the solvent and the adhesive being stripped as the shaft 60 is installed into the grip 10. The tapered front edge 52 of the bore 50, as discussed above, can ensure that the solvent and/or adhesive are not stripped from the tape 70 allowing the adhesive to securely couple the grip 10 to the shaft 60.

Figure 7:
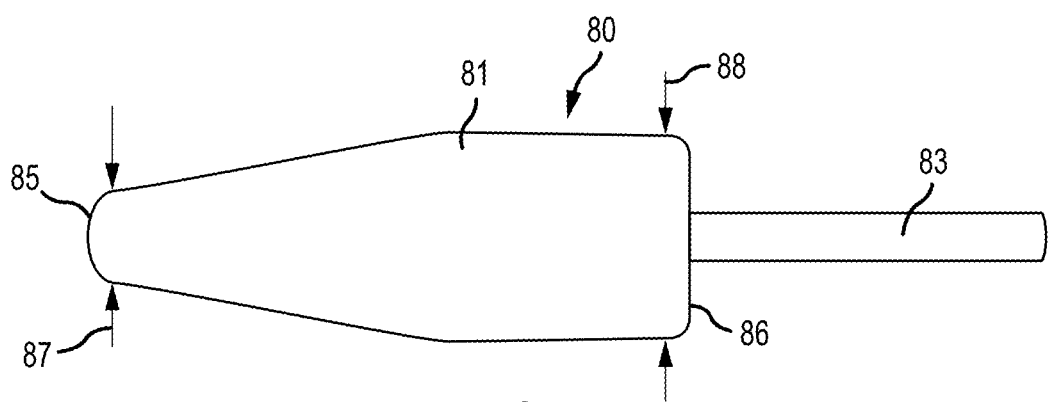
FIG. 7 illustrates a side view of a tool for removing flashing from a grip.

Further, described herein is a conic-shaped filing tool 80 for creating the angled 55 of the front edge 52 of the grip 10. As illustrated in FIG. 7, the tool 80 can comprise a body 81 having a tip 85 and a base 86. The body 81 can comprise a conical shape which is angled from a greatest diameter 88 positioned near the base 86 of the body 81 to a smallest diameter 87 at the tip 85 of the body 81. The angle with which the body 81 is tapered corresponds with the angle 55 of the front edge 52. For example, the angle of the body 81 can be between 1 and 30 degrees. In other embodiments, the body 81 can taper at an angle between 1 and 5, 3 and 7, 5 and 9, 7 and 11, 9 and 13, 11 and 15, 13 and 17, 15 and 19, 17 and 21, 19 and 23, 21 and 25, 23 and 27, or 25 and 30 degrees. The diameter 87 of the tip 85 of the body 81 can be the same or slightly smaller than the diameter of the opening 51 on the grip 10. For example, the tip can have a diameter 87 of 0.525 inches. In other embodiments, the tip diameter 87 can be within the range of 0.3 to 0.9 inches. In other embodiments, the tip diameter 87 can be within the range of 0.3-0.4, 0.35-0.45, 0.4-0.5, 0.45-0.55, 0.5-0.6, 0.55-0.65, 0.6-0.7, 0.65-0.75, 0.7-0.8, 0.75-0.85, or 0.8-0.9 inches.

The body 81 of the tool 80 can be used to grind or file the sharp front edge 52 from the grip 10. As such, the body 81 can be comprised of an abrasive material. The abrasive material can be a conventional abrasive material or it can be a superabrassive material. Further, the abrasive material can be significantly harder than the material used to form the grip 10. For example, the body 81 can be comprised of aluminum oxide, silicon carbide, emery, pumice, sand, steel abrasive, diamond, cubic boron nitride, or any other suitable abrasive material.

The filing tool 80 can also comprise a handle 83 extending from the base 86 of the body 81. The handle 83 can comprise plastic, metal, ceramic or any other suitable material. Further, the handle 83 can be configured to be operated by a person or the handle 83 can be configured to fit within a power tool, such as a drill, drill press, angle grinder, die grinder or any other suitable power tool.

Installation Process—Golf Club

Figure 8:
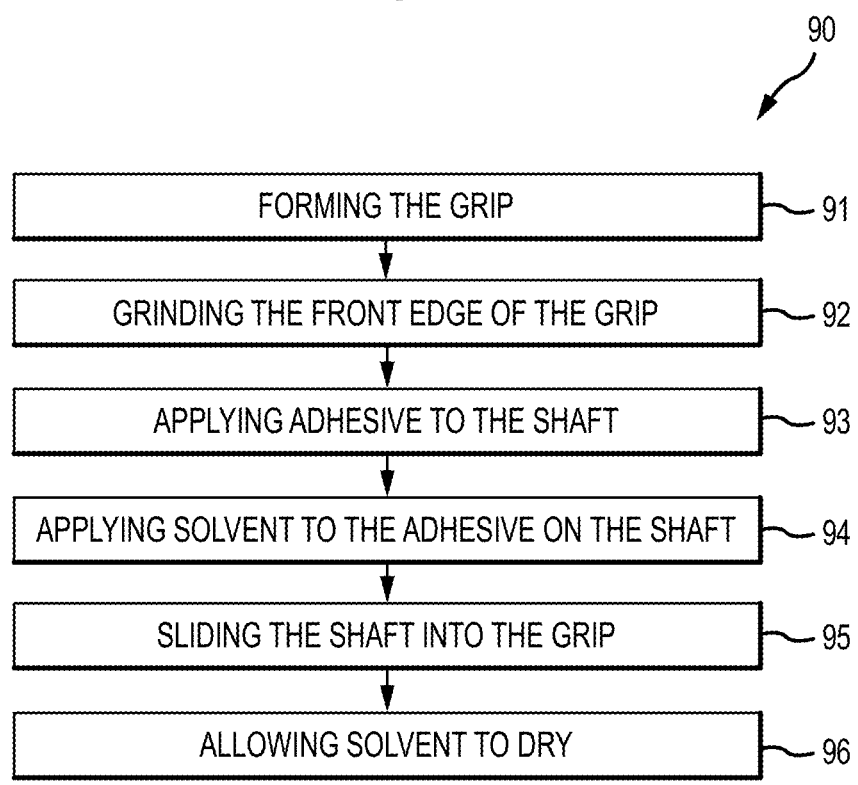
FIG. 8 illustrates a schematic view of a method for installing a grip on a shaft.

FIG. 8 illustrates an installation process 90 for installing the grip 10 to the shaft 60 as illustrated in FIGS. 1-6. With reference to FIG. 8, the installation process 90 includes a first step 91 of forming the grip 10. The grip 10 is formed for example by injection molding, negative cavity molding, compression molding, casting, additive manufacturing, thermoforming, rotational molding or any other appropriate processes known to those skilled in the art.

Generally, when the grip 10 is first formed, the opening 51 on the first end 20 of the grip 10 includes a sharp front edge 52, referred to as the flashing. Flashing is the excess material attached to the grip during the molding or casting process used to form the grip 10. Generally, the flashing is created due to leakage of the material between the two surfaces of a mold, or between the base material and the mold.

Referring again to FIG. 8, the installation process 90 further includes a second step 92 of grinding or tapering the front edge 52. The flashing or sharp front edge 52 can cause an issue during the fifth step 95, discussed in greater detail below, involving sliding the grip 10 onto the shaft 60. Therefore, referring to FIG. 7, a conic shaped filing tool 80 can be utilized to grind, or file away the sharp front edge to form the front edge 52 at angle 55, as shown in FIG. 2. The tool 80 is used in the second step 92 of the installation process 90 by inserting the tip 85 into the opening 51 of the grip 10. The tool 80 can then be manually or automatically rotated to create friction between the abrasive material of the body 81 and the material of the grip 10. The force of the friction causes the material of the grip 10 to be removed and forms an internal angled front edge 52 in the bore 50 of the grip 10.

Referring again to FIG. 8, the installation process 90 includes a third step 93 of applying an adhesive to the shaft 60. In many embodiments, the adhesive is a double-sided tape 70. The tape 70 is applied to the shaft 60 such that a first side couples with the shaft 60 while a second side is exposed, and configured to couple with the interior of the bore 50 within the grip 10. In some embodiments, the tape 70 can be applied equally across the length of the shaft 60 which is configured to be received within the bore 50. In other embodiments, referring back to FIG. 5, wherein the shaft 60 is tapered, the tape 70 can be layered as illustrated in FIG. 6. The portion of the shaft 60 which includes the smallest diameter is wrapped with extra layers of tape 70, such that the shaft 60 including the tape 70 comprises a constant diameter 65. In other embodiments, the adhesive can be glue, cement, mucilage, paste, tape, or any other suitable adhesive.

Referring again to FIG. 8, the installation process 90 further includes a fourth step 94 of applying a solvent to the adhesive and a fifth step 95 of sliding the shaft 60 into the grip 10. Applying the solvent to the adhesive temporarily deactivates the bonding characteristics of the adhesive so that the shaft 60 can easily be slid into bore 50 within the grip 10. In the illustrated embodiment, the solvent used is a LVP aliphatic petroleum distillate. In other embodiments, the solvent can be a mineral spirit, denatured alcohol, acetone, or any other suitable solvent known to one of skill in the art. Further, the angled front edge 52 of the bore 50 formed during the second step 92 of the installation process 90 allows for the shaft 60 to be slid into the grip 10 without the front edge 52 of the grip stripping the adhesive and solvent from the shaft 60.

Referring again to FIG. 8, the installation process 90 includes a sixth step 96 of allowing the solvent to dry and the adhesive to set. As the solvent dries the adhesives reactivates and secures the grip 10 to the shaft 60, ensuring that no unwanted shifting or rotations of the grip occur.

Examples

A comparison was done between the current gripping production process and the gripping production process described herein with respect to a golf club. The current gripping process leaves a wad or bead of adhesive at the first end 20 of the grip 10 after the grip 10 is forced onto the shaft 60. The current process comprises forming the grip, applying adhesive to the shaft, applying solvent to the adhesive on the shaft, sliding the shaft into the grip, removing the exposed adhesive, and allowing the solvent to dry. In the current process, the first end 20 of the grip 10 is not tapered. In this example, the first end 20 of the grip 10 comprises an angled front edge 52 extending roughly 0.125 inches from the first end 20 towards the second end 30 of the grip 10 at an angle 55 of 3 degrees. The front edge 52 of the grip 10, in this example, tapers from a first diameter 53 of 0.536 inches to a second diameter 54 of 0.530 inches. Furthermore, in this example embodiment, the diameter 64 of the top portion 620 of the shaft 60 is least adjacent the first end 20 of the grip 10 and greatest adjacent the second end 30 of the grip 10.

In this example embodiment, tape 70 and glue are used as adhesives. The tape 70 is wrapped around at least a portion of the shaft 60, and the glue is applied on top of the tape 70 before the shaft 60 is forced into the grip 10. When the shaft 60 is forced into the grip 10, the first end 20 of the grip 10 squeegees the glue from the tape 70, leaving a wad or bead of glue at the first end 20 of the grip 10. This not only reduces the amount of adhesion between the shaft 60 and the grip 10, but also requires removing the wad or bead of glue and cleaning the golf club.

The process described herein comprises forming the grip, grinding the front edge of the grip, applying adhesive to the shaft, applying solvent to the adhesive, sliding the shaft into the grip, and allowing the solvent to dry. The process described herein does not leave a wad or bead of adhesive at the first end 20 of the grip 10 after the grip 10 is forced onto the shaft 60. Rather, the grinding of the front edge 52 of the grip 10 allows the grip 10 to slide onto the shaft 60 without squeegeeing off some or all of the adhesive. In the exemplary embodiment, tape 70 and glue were used as adhesives, in a similar manner as for the current process described above. However, in the process described herein, the glue remains between the shaft 60 and the grip 10 after the grip 10 is slid onto the shaft 60. No wad or bead of glue is formed at the first end 20 of the grip 10. Thus, the step of removing and cleaning off the glue is eliminated. Furthermore, more adhesive is left between the grip 10 and the shaft 60, which increases the strength of the bond, improving quality.

Figure 28:
FIG. 28 illustrates a shaft and grip assembly that leaves excess adhesive after the gripping process.
Figure 29:
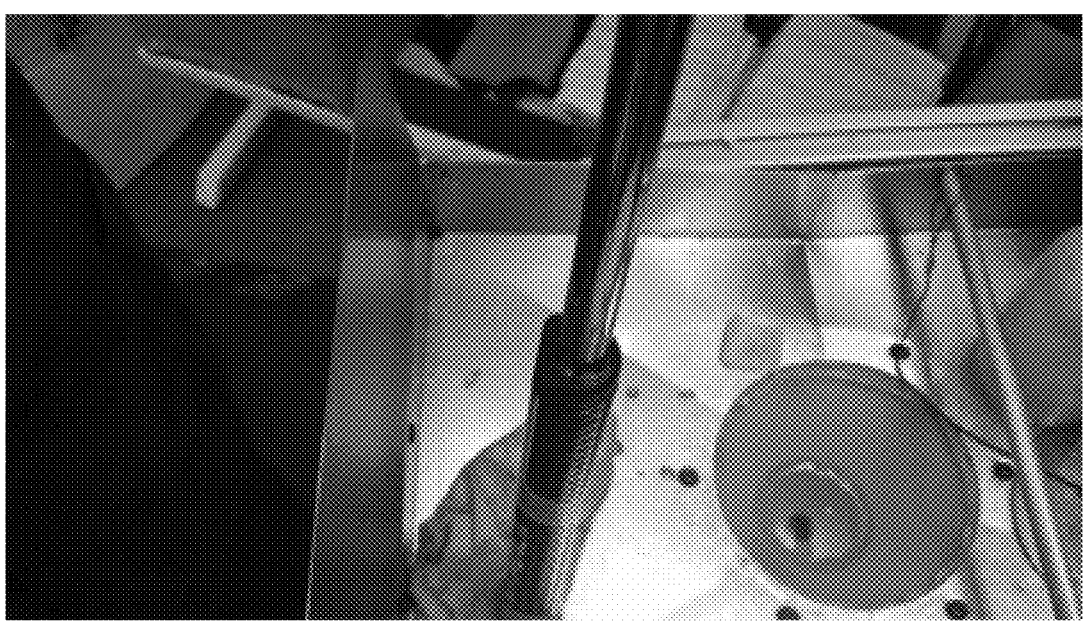
FIG. 29 illustrates a shaft and grip assembly that does not leave excess adhesive after the gripping process.

FIG. 28 shows the results of the current gripping process, wherein a wad or bead of adhesive is squeegeed off the top portion 62 of the shaft during the process. FIG. 29 shows the results of the gripping process described herein. As can be seen in FIG. 29, the tapered opening of the grip prevents the adhesive from getting squeeged off of the shaft during the assembly process.

The gripping process described herein can increase the quality of the product by allowing more adhesive to remain between the shaft and the grip. Furthermore, the process of gripping is simplified by eliminating the need to remove excess adhesive after the shaft is placed into the grip.

While the above example may be described in connection with a golf club, the apparatus, methods, and articles of manufacture described herein may be applicable to other types of sports equipment such as hockey sticks, tennis rackets, fishing poles, ski poles, etc. Additional examples of such changes and others have been given in the foregoing description. Other permutations of the different embodiments having one or more of the features of the various figures are likewise contemplated. Accordingly, the specification, claims, and drawings herein are intended to be illustrative of the scope of the disclosure and is not intended to be limiting. It is intended that the scope of this application shall be limited only to the extent required by the appended claims.

Hammer Embodiment

Referring to FIG. 9, a perspective view of a hammer 100 with a head 101, a handle 160, and a grip 110 is illustrated. The handle 160 comprises a head portion 161, adjacent head 101, and an end portion 162, opposite the head 101. The head portion 161 is configured to couple to the head 101 of the hammer 100, and the end portion 162 is configured to be received within a bore 150 of a grip 110. In the illustrated embodiment, the handle 160 is cylindrical with an outer diameter 164. The outer diameter 164 of the handle 160 can increase, decrease, or remain constant from the head portion 161 to the end portion 162. In some embodiments, the handle 160 can have a constant diameter across a percentage of the end portion 162 and begin to taper towards the head portion 161 after a certain length. In some embodiments, the end portion 162 of the handle 160 can have a greatest diameter 164 within the range of 0.98 to 2.00 inches (25.0 to 50.8 mm). For example, the handle 160 can have a greatest diameter 164 of 0.98 to 1.0 inch, 1.0 to 1.2 inch, 1.2 to 1.4 inch, 1.4 to 1.6 inch, 1.6 to 1.8 inch, or 1.8 to 2.0 inches. In some embodiments, the handle 160 comprises an elliptical cross section. The elliptical cross section can have a width and a height, wherein the ratio of the width to the height is 1:1.10, 1:1.15, 1:1.20, 1:1.25, 1:1.30, 1:1.35, 1:1.40, or 1:1.45.

The bore 150 of the grip 110 of the hammer 100 can extend from a first end 120 of the grip 110 to near the second end 130 of the grip 110. The first end 120 is open to the exterior and a hollow tubular body of the grip 110 extends from the open first end 120 to a capped second end 130. The end portion diameter 164 of the handle 160 can be slightly less than, greater than or the same as the greatest diameter of the bore 150 within the grip 110. The tight tolerance between the two diameters ensures that the frictional forces between the handle 160 and the bore 150 will be greater, thus forming a more secure connection after the installation process is complete.

An adhesive can also be applied to the handle 160 to aid in securing the grip 10 to the end portion 162 of the handle 160. In many embodiments, the adhesive applied to the handle 160 can comprise a double-sided tape 170 (FIGS. 10 and 11). The tape 170 can be applied such that, a first side of the tape 170 is coupled to the handle 160, while a second side of the tape 170 is left exposed and configured to couple with the bore 150 in the grip 110. Referring to FIG. 11, the handle 160 is tapered while the bore 150 within the grip 110 has a constant diameter. In other words, in some embodiments, the handle 160 is tapered such that the outer diameter 164 varies along the length of the handle 160. The non-constant diameter of the handle 160 results in the separation between the handle 160 and the bore 150 near the front end 120 of the grip 110. The separation between the handle 160 and the bore 150 is greater than the separation between the two surfaces near the second end 130 of the grip 110. The greater separation can result in the adhesive not being able to properly secure the grip 110 to the handle 160. Therefore, to ensure the adhesive can properly secure the two components, additional layers of tape 170 can be included on the portion of the handle 160 configured to be received within the bore 150 near the front end 120 of the grip 110.

As illustrated in FIG. 10, an adhesive can be positioned between a portion of the handle 160 and the grip 110. The illustrated adhesive comprises double-sided tape 170. In many embodiments, the adhesive further comprises a glue, epoxy, cement, or other adhesive. In some embodiments, such as is illustrated in FIG. 11, the combined diameter 165 of the handle 160 and the tape 170 is equal to the greatest handle diameter 164. In other embodiments, the combined diameter 165 increases or decreases from a portion of the handle 160 adjacent the first end 120 to a portion of the handle 160 adjacent the capped second end 130 of the grip 110. Similarly, the diameter of the bore 150 of the grip 110 can increase, decrease, or remain constant from the first end 120 to the second end 130 of the grip 110. In the embodiment of FIG. 11, the diameter of the bore 150 of the grip 110 remains constant in order to ensure a tight fit with the tape 170 which compensates for the varying diameter of the handle 160. The tape 170 can be layered in a manner similar to the manner described above with reference to the golf club shaft 60, grip 10, and tape 70.

The tight tolerance between the diameter of handle 160 (including the tape 170) and the diameter of the bore 150 can cause high friction forces making it difficult to slide the handle 160 into the bore 150 of the grip 160. To ease the installation process of sliding the handle 160 into the grip 110, a solvent can be applied to the tape 170 or adhesive. The solvent applied to the tape 170 can temporarily deactivate the bonding characteristics of the tape 170, lowering the frictional forces and therefore, allowing the handle 160 to easily be slid into the grip 110. However, in some embodiments, the tight tolerance between the two diameters can result in both the solvent and the adhesive being stripped as the handle 160 is installed into the grip 110. A tapered front edge 152 of the bore 150, as discussed below with reference to FIG. 13, can ensure that the solvent and/or adhesive are not stripped from the tape 170 allowing the adhesive to securely couple the grip 110 to the handle 160.

As illustrated in the FIG. 12 embodiment, the grip 110 can be installed directly onto the handle 160. The illustrated embodiment comprises a constant-diameter handle 160 and a constant-diameter bore 150 in the grip 110. In some embodiments, an adhesive layer between the handle 160 and the grip 110 ensures that the grip 110 will not come loose during use of the hammer 100.

Referring now to FIG. 13, the first end 120 of the grip 110 is illustrated. The bore 150 extends entirely through the first end 120 creating an opening 151 from the exterior of the grip, to the hollow tubular body. The opening 151 includes a front edge 152 which can be tapered in a direction from the first end 120 towards the second end 130. In the illustrated embodiment, the front edge 152 is tapered at an angle of 3 degrees extending for a distance of 0.125 inches in a direction extending generally from the front end 120 to the second end 130 of the grip 110. Therefore, the front edge 152 of the grip 110, in the illustrated embodiment, is tapered from a first diameter 153 of 1.588 inches to a second diameter 154 of 1.575 inches along a distance of 0.125 inches. In some embodiments, the first diameter 153 and second diameter 154 can be within the range of 0.98 to 2.00 inches (25.0 to 50.8 mm). For example, the first 153 and second 154 diameters can be within the range of 0.98 to 1.0 inch, 1.0 to 1.2 inch, 1.2 to 1.4 inch, 1.4 to 1.6 inch, 1.6 to 1.8 inch, or 1.8 to 2.0 inches.

Further, the internal front edge 152 and a portion of the bore 150 having the second diameter 154 form an angle 155. In some embodiments, the front edge 152 can taper at an angle 155 between 0.5 and 30 degrees with respect to the main portion of the bore 150. In other embodiments, the front edge 152 can taper at an angle 155 between 0.5 and 3, 0.5 and 5, 1 and 5, 3 and 7, 5 and 9, 7 and 11, 9 and 13, 11 and 15, 13 and 17, 15 and 19, 17 and 21, 19 and 23, 21 and 25, 23 and 27, or 25 and 30 degrees. Additionally, in some embodiments, the angled front edge 152 can extend between 0.01 to 0.75 inches from at or near the first end 120 in a direction extending generally towards the second end 130. In other embodiments, the angled front edge 152 can extend between 0.01 to 0.1, 0.05 to 0.15, 0.1 to 0.2, 0.25 to 0.35, 0.3 to 0.4, 0.35 to 0.45, 0.4 to 0.5, 0.45 to 0.55, 0.5 to 0.6, 0.55 to 0.65, 0.6 to 0.7, or 0.65 to 0.75 inches from at or near the first end 120 in a direction extending generally towards the second end 130.

The hammer 100 and grip 110, illustrated in FIGS. 9-13, is exemplary of one embodiment of a hammer with a tapered grip. Other embodiments of hammers or other similar tools with tapered grips can incorporate grip bore shapes, dimension variations, adhesive compositions, materials, and other aspects of the tool and tapered grip as described in the general detailed description and/or in other exemplary embodiments described herein. A method of installing the grip 110 onto the hammer 100 can be similar to the method of installing a grip 10 onto a golf club, as described above.

Pliers Embodiment

Figure 14:
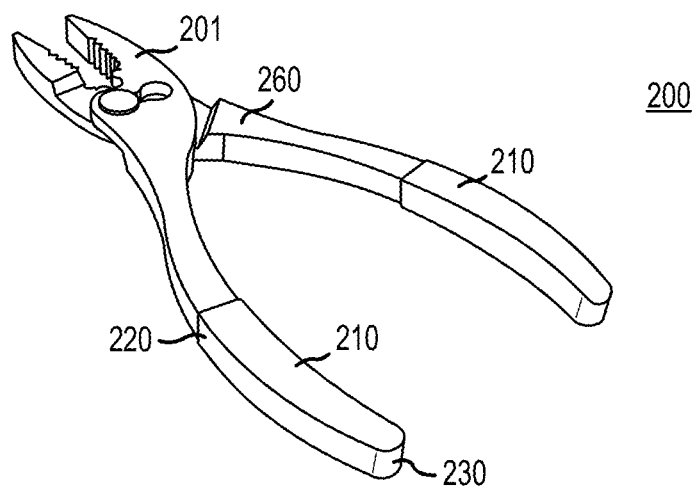
FIG. 14 illustrates a perspective view of a pair of pliers with grips on the handles.

Referring to FIG. 14, a pair of pliers 200 (hereafter "pliers") with a pair of grips 210 is illustrated. The pliers comprise a head 201, two handles 260, and the pair of grips 210. In the illustrated embodiment, the handles 260 comprise a cross-sectional shape that is square. Similarly, the corresponding grips 210 each comprise square-shaped bores 250. Each square-shaped bore 250 comprises a side wall width. The grips 210 each comprise a first end 220 and a second end 230. The second end 230 of each grip 210 is capped off so that the handles 260 cannot extend through the second end 230 of each grip 210. The side wall width of the grip 210 can increase, decrease, or remain constant between the first end 220 and the second end 230. There is a tight tolerance between the outer surface of each handle 260 and the bore 250 of each grip 210. The square-shaped bores 250 can each comprise a tapered opening 251.

Figure 15:
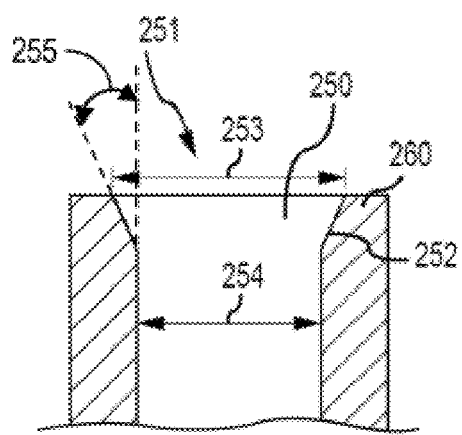
FIG. 15 illustrates a cross-section of a portion of one of the grips of FIG. 14.

Referring now to FIG. 15, the first end 220 of the grip 210 is illustrated. The bore 250 extends entirely through the first end 220 creating the opening 251 from the exterior of the grip 210, to the hollow tubular body 240. The opening 251 includes a front edge 252 which can be tapered in a direction from the first end 220 towards the second end 230. The internal front edge 252 and a portion of the bore 250 having the second diameter 254 form an angle 255.

In the illustrated embodiment, the front edge 252 is tapered at an angle 255 of 3 degrees extending for a distance of 0.125 inches in a direction extending generally from the front end 220 to the second end 230 of the grip 210. Therefore, the front edge 252 of the grip 210, in the illustrated embodiment, is tapered such that the first width 253 of a side wall of the bore 250 varies from roughly 0.323 inches to a second width 254 of 0.310 inches along a distance of 0.125 inches. In some embodiments, the first width 253 and second width 254 can be within the range of 0.2 to 0.8 inch. In other embodiments, the first 253 and second 254 widths can be within the range of 0.20-0.25, 0.25-0.30, 0.30-0.40, 0.35-0.45, 0.40-0.50, 0.45-0.55, 0.50-0.60, 0.55-0.65, 0.60-0.70, 0.65-0.75, 0.70-0.80, or 0.75-0.80 inch. Further, in some embodiments, the front edge 252 can taper at an angle 255 between 0.5 and 30 degrees with respect to the main portion of the bore 250. In other embodiments, the front edge 252 can taper at an angle 255 between 0.5 and 3, 0.5 and 5, 1 and 5, 3 and 7, 5 and 9, 7 and 11, 9 and 13, 11 and 15, 13 and 17, 15 and 19, 17 and 21, 19 and 23, 21 and 25, 23 and 27, or 25 and 30 degrees. Additionally, in some embodiments, the anged front edge 252 can extend between 0.01 to 0.75 inches from at or near the first end 220 in a direction extending generally towards the second end 230. In other embodiments, the angled front edge 252 can extend between 0.01 to 0.1, 0.05 to 0.15, 0.1 to 0.2, 0.25 to 0.35, 0.3 to 0.4, 0.35 to 0.45, 0.4 to 0.5, 0.45 to 0.55, 0.5 to 0.6, 0.55 to 0.65, 0.6 to 0.7, or 0.65 to 0.75 inches from at or near the first end 220 in a direction extending generally towards the second end 230.

Figure 16:
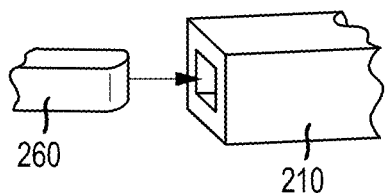
FIG. 16 illustrates a perspective depiction of the insertion of the handles of the pliers of FIG. 14 into the grips of FIG. 14.

The pair of pliers 200 illustrated in FIGS. 14-16 is exemplary of one embodiment of a pair of pliers with tapered grips. Other embodiments of pliers or other similar tools with tapered grips can incorporate grip bore shapes, dimension variations, adhesive compositions, materials, and other aspects of the tool and tapered grip as described in the general detailed description and/or in other exemplary embodiments described herein.

A method of installing the grips 210 onto the pair of pliers 200 can be similar to the method of installing a grip 10 onto a golf club shaft 160, as described above. The method can comprise forming the grips 210, grinding the front edges 252 of the grips 210, applying adhesive to the handles 260, applying solvent to the adhesive on the handles 260, sliding the handles 260 into the grips 210, and allowing the solvent to dry.

As illustrated in FIG. 16, the step of sliding each handle 260 into each grip 210 can comprise aligning the square end of one of the handles 260 with the square bore 250 of one of the grips 210. In the illustrated embodiment, the adhesive does not comprise tape. However, in other embodiments, the handles 260 are layered in adhesive tape, as described in the exemplary golf club embodiment, before being slid into the grips 210. In some embodiments, solvent is not applied on top of the adhesive. In these embodiments, the handles 260 are slid onto the grips 210 directly after the adhesive is applied to the handles 260.

Shovel Embodiment

Figure 17:
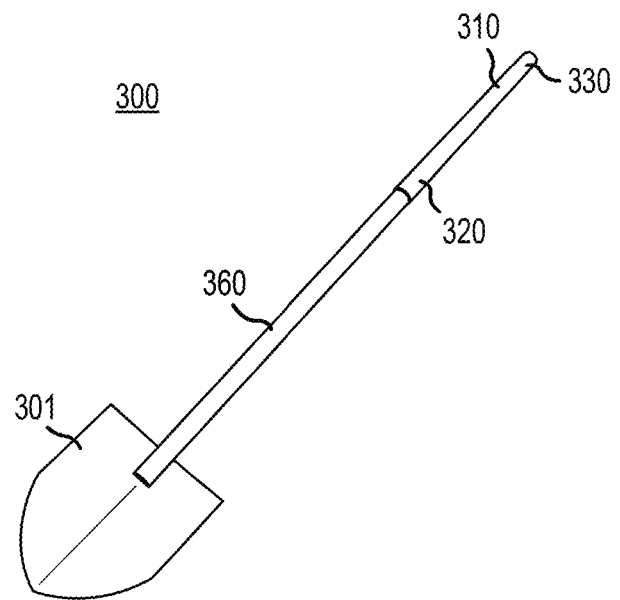
FIG. 17 illustrates a perspective view of a shovel with a grip.
Figure 18:
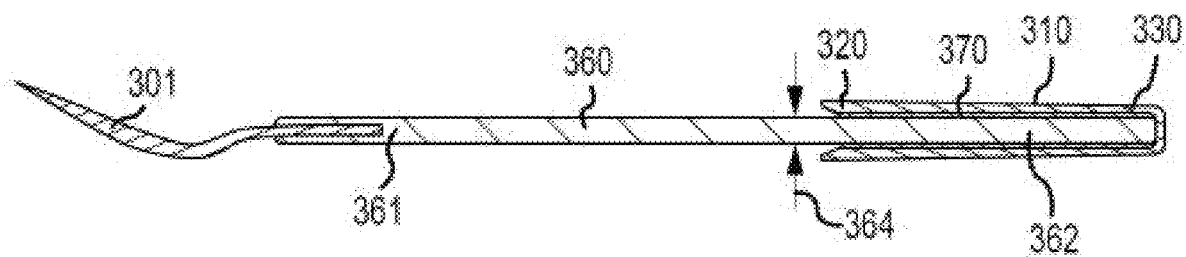
FIG. 18 illustrates a cross-section of the shovel of FIG. 17.

Referring to FIGS. 17 and 18, a shovel 300 with a grip 310 is illustrated. The shovel comprises a head 301, a shaft 360, and a grip 310. The shaft 360 comprises a head portion 361, adjacent head 301, and an end portion 362, opposite the head 301. The head portion 361 is configured to couple to the head 301 of the shovel 300, and the end portion 362 is configured to be received within a bore of a grip 310. In the illustrated embodiment, the shaft 360 is cylindrical with an outer diameter 364. In the illustrated embodiment, the outer diameter 364 of the shaft 360 remains constant from the head portion 361 to the end portion 362. In other embodiments, the shaft 360 can have a constant diameter across a percentage of the end portion 362 and begin to taper towards the head portion 361 after a certain length. In other embodiments, the diameter 364 of the shaft 360 can increase or decrease from the head portion 361 to the end portion 362. In some embodiments, the end portion 362 of the shaft 360 can have a greatest diameter 364 within the range of 0.510-0.540, 0.530-0.560, 0.550-0.580, 0.570-0.600, 0.590-0.620, 0.620-0.650, 0.650-0.680, 0.680-0.710, 0.710-0.740, 0.740-0.770, 0.770-0.800, 0.800-0.830, 0.830-0.860, 0.860-0.890, 0.890-0.920, 0.920-0.950, 0.950-0.980, 0.980-1.010, 1.010-1.040, 1.040-1.070, 1.070-1.100, 1.100-1.130, 1.130-1.200, 1.200-1.300, 1.300-1.400, 1.400-1.500, 1.500-1.600, 1.600-1.700, 1.700-1.800, 1.800-1.900, or 1.900-2.000 inches.

In the illustrated embodiment of FIGS. 17 and 18, the grip 310 comprises a circular bore. The bore comprises a diameter. The grip 310 further comprises a first end 320 and a second end 330. The second end 330 of the grip 310 is capped off so that the shaft 360 cannot extend through the second end 330 of the grip 310. In other embodiments, not depicted, the second end is open, allowing the grip to be positioned at different locations on the shaft of the shovel. The diameter of the grip 310 in the illustrated embodiment decreases from the first end 320 of the grip to the second end 330 of the grip. In other embodiments, the diameter of the grip 310 can increase or remain constant between the first end 320 and the second end 330. There is a tight tolerance between the outer surface of the shovel shaft 360 and the bore of the grip 310. The grip bore comprises a tapered opening, similar to the tapered openings 52 and 152 of the golf club grip 10 and the hammer grip 160, respectively.

In the illustrated embodiment of FIG. 18, an adhesive is interposed between the shovel shaft 360 and the grip 310. The adhesive can be applied to the shaft 360 in a manner similar to the manner in which adhesive is applied to the shaft 60 of the golf club embodiment or the handle 160 of the hammer 100, as described above. In the illustrated embodiment of FIG. 18, the adhesive between the shovel shaft 360 and the grip 310 comprises double-sided tape. The adhesive further comprises a glue, epoxy, cement, or other adhesive. As described with respect to the golf club grip 60 and the hammer grip 160, the taper of the bore of the grip 310 and the constant diameter 364 of the shaft 360 creates a separation between the shaft 360 and the grip 310. To ensure the adhesive can properly secure the two components, the adhesive comprises one or more layers of double-sided tape 370. The tape 370 can be applied as described above, such as for the golf club and the hammer 100.

The shovel 300 illustrated in FIGS. 17 and 18 is exemplary of one embodiment of a shovel with a tapered grip. Other embodiments of shovels, camping shovels, trowels, or other similar tools with tapered grips can incorporate grip bore shapes, dimension variations, adhesive compositions, materials, and other aspects of the tool and tapered grip as described in the general detailed description and/or in other exemplary embodiments described herein. A method of installing the grip 310 onto the shovel 300 can be similar to the method of installing a grip 10 onto a golf club shaft 160, as described above.

Fishing Rod Embodiment

Figure 19:
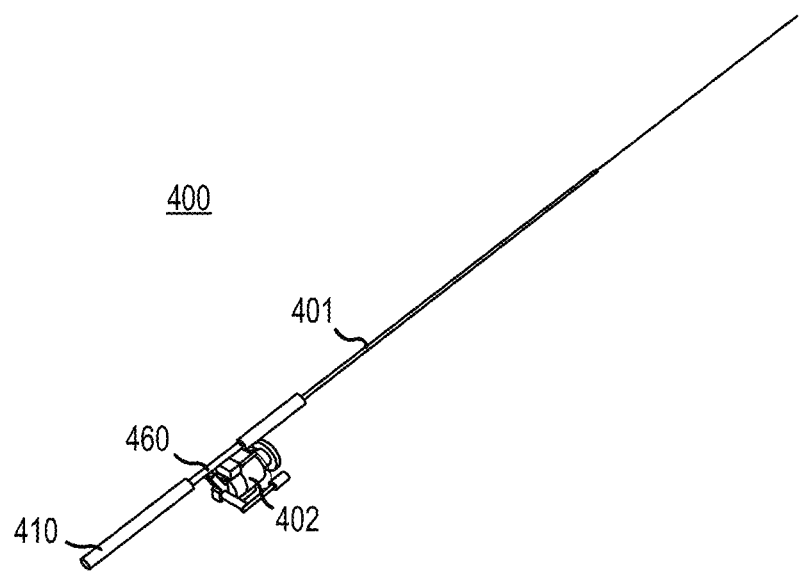
FIG. 19 illustrates a perspective view of a fishing rod with a grip.

Referring to FIG. 19, a fishing rod 400 with a grip 410 is illustrated. The fishing rod comprises a rod 401, a reel 402, a handle 460, and a grip 410. The shaft 460 comprises a reel portion 461, adjacent reel 402, and an end portion 462, opposite the reel portion 461. The reel portion 461 is configured to couple to the rod 401 and the reel 402 of the fishing rod 400, and the end portion 462 is configured to be received within a bore of a grip 410. In the illustrated embodiment, the handle 460 is cylindrical with an outer diameter 464. In the illustrated embodiment, the outer diameter 464 of the handle 460 remains constant from the reel portion 461 to the end portion 462. In other embodiments, the handle 460 can have a constant diameter across a percentage of the end portion 462 and begin to taper towards the reel portion 461 after a certain length. In other embodiments, the diameter 464 of the handle 460 can increase or decrease from the head portion 461 to the end portion 462. In some embodiments, the end portion 462 of the handle 460 can have a greatest diameter 464 within the range of 0.510-0.540, 0.530-0.560, 0.550-0.580, 0.570-0.600, 0.590-0.620, 0.620-0.650, 0.650-0.680, 0.680-0.710, 0.710-0.740, 0.740-0.770, 0.770-0.800, 0.800-0.830, 0.830-0.860, 0.860-0.890, 0.890-0.920, 0.920-0.950, 0.950-0.980, 0.980-1.010, 1.010-1.040, 1.040-1.070, 1.070-1.100, 1.100-1.130, 1.130-1.200, or 1.200-1.300 inches.

Figure 20:
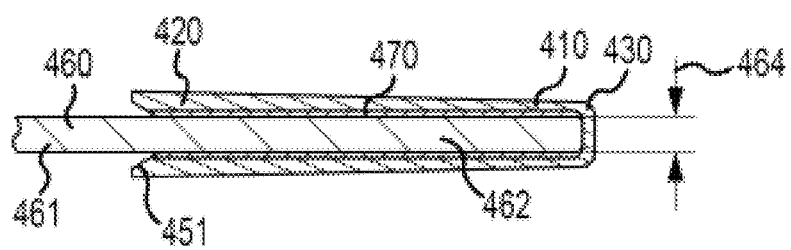
FIG. 20 illustrates a cross-section of a portion of the fishing rod of FIG. 19.

In the illustrated embodiment of FIGS. 19 and 20, the grip 410 comprises a circular bore. The bore comprises a diameter. The grip 410 comprises a first end 420 and a second end 430. The second end 430 of the grip 410 is capped off so that the handle 460 cannot extend through the second end 430 of the grip 410. In other embodiments, not depicted, the second end is open, allowing the grip to be positioned at different locations on the handle of the fishing rod. The diameter of the grip 410 in the illustrated embodiment decreases from the first end 420 of the grip to the second end 430 of the grip. In other embodiments, the diameter of the grip 410 can increase or remain constant between the first end 420 and the second end 430. There is a tight tolerance between the outer surface of the fishing rod handle 460 and the bore of the grip 410. The grip bore comprises a tapered opening 451, similar to the tapered openings 52 and 152 of the golf club grip 10 and the hammer grip 160, respectively.

In the illustrated embodiment of FIG. 20, an adhesive is interposed between the fishing rod handle 460 and the grip 410. The adhesive can be applied to the shaft 460 in a manner similar to the manner in which adhesive is applied to the shaft 60 of the golf club embodiment or the handle 160 of the hammer 100, as described above. In the illustrated embodiment of FIG. 20, the adhesive between the fishing rod handle 460 and the grip 410 comprises double-sided tape 470. The adhesive further comprise a glue, epoxy, cement, or other adhesive. As described with respect to the golf club grip 60 and the hammer grip 160, the taper of the bore of the grip 410 and the constant diameter 464 of the handle 460 creates a separation between the handle 460 and the grip 410. To ensure the adhesive can properly secure the two components, the adhesive comprises one or more layers of double-sided tape 470. The tape 470 can be applied as described above, such as for the golf club and the hammer 100.

The fishing rod illustrated in FIGS. 19 and 20 is exemplary of one embodiment of a fishing rod with a tapered grip. Other embodiments of fishing rods, fishing equipment, hunting equipment, or other types of sports equipment with tapered grips can incorporate grip bore shapes, dimension variations, adhesive compositions, materials, and other aspects of the tool and tapered grip as described in the general detailed description and/or in other exemplary embodiments described herein. A method of installing the grip 410 onto the fishing rod 400 can be similar to the method of installing a grip 10 onto a golf club shaft 160, as described above.

Workout Roller Wheel Embodiment

Figure 21:
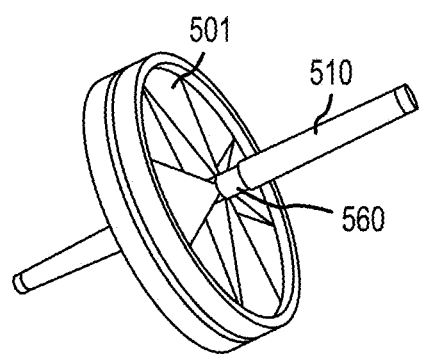
FIG. 21 illustrates a perspective view of a workout roller wheel.

Referring to FIG. 21, a workout roller wheel 500 (hereafter "roller wheel") with grips 510 is illustrated. The roller wheel comprises one or more wheels 501 (hereafter referred to as one "wheel"), an axle 560, and two grips 510. The wheel 501 is centrally located on the roller wheel assembly. The axle 560 extends through a hub of the wheel 501. The axle 560 protrudes equally on either side of the wheel 501. The axle 560 comprises two ends, both of which act as handles. The wheel 501 rotates freely around the axle 560. The grips 510 cover the ends of the axle 560 so that the user can firmly grip the axle 560 on either side of the wheel 501.

In some embodiments, an outer diameter of the axle 560 remains constant across at least a portion of the axle. In some embodiments, the axle 560 comprises at least two sections wherein the outer diameter of the axle 560 is constant. In some embodiments, the axle 560 can be tapered such that the outer diameter increases towards the ends of the axle 560. In other embodiments, the axle 560 can be tapered such that the outer diameter decreases towards the ends of the axle 560. In some embodiments, the ends of the shaft 560 can have a greatest diameter within the range of 0.510-0.540, 0.530-0.560, 0.550-0.580, 0.570-0.600, 0.590-0.620, 0.620-0.650, 0.650-0.680, 0.680-0.710, 0.710-0.740, 0.740-0.770, 0.770-0.800, 0.800-0.830, 0.830-0.860, 0.860-0.890, 0.890-0.920, 0.920-0.950, 0.950-0.980, 0.980-1.010, 1.010-1.040, 1.040-1.070, 1.070-1.100, 1.100-1.130, 1.130-1.200, or 1.200-1.300 inch.

Figure 22:
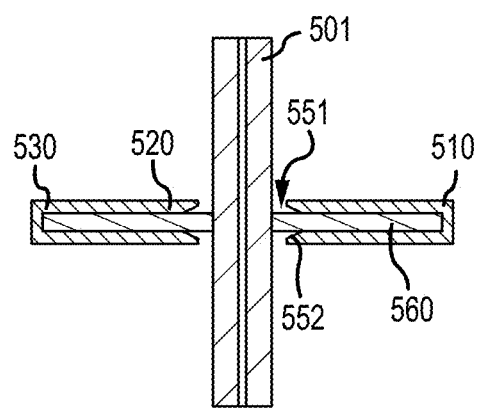
FIG. 22 illustrates a cross-section of a portion of the workout roller wheel of FIG. 21, showing a constant-diameter shaft and a taper on the end of the grip.

In the illustrated embodiment of FIGS. 21 and 22, the grips 510 each comprises a circular bore. The bores each comprise a diameter. The grips 510 each comprise a first end 520 and a second end 530. The second end 530 of each grip 510 is capped off so that the axle 560 cannot extend through the second end 530 of each grip 510. The diameter of each grip 510 in the illustrated embodiment remains roughly constant from the first end 520 of each grip to the second end 530 of each grip, except for a tapered portion at the opening 551. In other embodiments, the diameter of the grip 510 can increase or remain constant between an end of the axle 560 and a center portion of the axle 560 adjacent the wheel 501. There is a tight tolerance between the outer surface of the axle 560 and the majority of the bore of the grip 510. A portion of the first end 520 of the grip comprises a tapered opening 551, similar to the tapered openings 52 and 152 of the golf club grip 10 and the hammer grip 160, respectively. The tapered opening 551 allows the grip 510 to be slid onto the axle 560 with less resistance. Furthermore, when an adhesive is used between the axle 560 and the grip 510, the tapered opening 551 prevents the adhesive from being pushed off of the axle 560 during assembly.

As described in general above, the first end of a grip without a tapered opening often has flashing leftover from the molding process. This flashing can squeegee the adhesive off of the axle when the grips are slid onto the axle. The flashing can be filed, ground, or otherwise removed from the opening of the grip. This removal creates a tapered opening extending generally from the first end of the grip towards the second end of the grip. In many embodiments, the taper is slight and consequently when the grip is placed onto the shaft, handle or axle, the material of the grip deforms, causing the taper to no longer be visible. However, in some embodiments, the taper is significant and consequently when the grip is placed onto the shaft, handle or axle, the taper is still visible in a cross-section of the assembly. An embodiment of the roller wheel 500 wherein the tapered opening 551 of the grip 510 is visible in a cross-sectional view is shown in FIG. 22.

In an embodiment with a tapered opening, a first diameter of the opening, adjacent the first end 520 of the grip, can be similar to the diameter 53 of the golf club grip 10, and can range from 0.4 to 1.8 inches. A second diameter of the opening, similar to the diameter 54 of the golf club grip 10, can also range from 0.4 to 1.8 inches. For example, in some embodiments the first diameter and the second diameter of the opening range from 0.4-0.5, 0.5-0.6, 0.6-0.7, 0.7-0.8, 0.8-0.9, 0.9-1.0, 1.0-1.1, 1.1-1.2, 1.2-1.3, 1.3-1.4, 1.4-1.5, 1.5-1.6, 1.6-1.7, or 1.7-1.8 inches. In other embodiments, the first and second diameters can be within the range of 0.45-0.55, 0.55-0.65, 0.65-0.75, or 0.75-0.85 inches. Further, in some embodiments, the front edge 552 can taper at an angle between 0.5 and 30 degrees with respect to the main portion of the bore. In other embodiments, the front edge 552 can taper at an angle between 0.5 and 3, 0.5 and 5, 1 and 5, 3 and 7, 5 and 9, 7 and 11, 9 and 13, 11 and 15, 13 and 17, 15 and 19, 17 and 21, 19 and 23, 21 and 25, 23 and 27, or 25 and 30 degrees. Additionally, in some embodiments, the angled front edge 552 can extend between 0.01 to 0.75 inches from at or near the first end 520 in a direction extending generally towards the second end 530. In other embodiments, the angled front edge 552 can extend between 0.01 to 0.1, 0.05 to 0.15, 0.1 to 0.2, 0.25 to 0.35, 0.3 to 0.4, 0.35 to 0.45, 0.4 to 0.5, 0.45 to 0.55, 0.5 to 0.6, 0.55 to 0.65, 0.6 to 0.7, or 0.65 to 0.75 inches from at or near the first end 520 in a direction extending generally towards the second end 530.

The workout roller wheel, illustrated in FIGS. 21 and 22, is exemplary of one embodiment of a roller wheel with a tapered grip. Other embodiments of roller wheels, portable workout equipment, stationary workout equipment, or other types of sports equipment with tapered grips can incorporate grip bore shapes, dimension variations, adhesive compositions, materials, and other aspects of the tool and tapered grip as described in the general detailed description and/or in other exemplary embodiments described herein. A method of installing the grip 510 onto the roller wheel 500 can be similar to the method of installing a grip 10 onto a golf club shaft 160, as described above.

Bicycle Embodiment

Referring to FIG. 23, the front of a bicycle 600 is illustrated. The bicycle comprises at least a body frame 601, two wheels 602, and handlebars 603. The wheels 602 and the handlebars 603 are attached to the body 601. The handlebars 603 have two handles 660 that are covered at least partially by two grips 610. Each grip 610 comprises a first end 620 and a second end 630. In most embodiments, the second end 630 of the grip 610 is capped off so that the handles 660 cannot extend through the second end 630 of the grip 610. In some embodiments, the second end 630 of the grip 610 can comprise an opening to allow the grips 610 to be placed further onto the handles 660.

As illustrated in FIG. 24, a regular bicycle grip 610 can have a bore 650 with a bore diameter that remains roughly constant from the first end 620 of the grip 610 to the second end 630 of the grip 610, except for a tapered portion at the opening 651. In other embodiments, the diameter of each grip 610 can increase or decrease between the first end 620 and second end 630 of the grip 610. A portion of the first end 620 of the grip 610 comprises a tapered opening 651, similar to the tapered openings 52 and 152 of the golf club grip 10 and the hammer grip 160, respectively. The tapered opening 651 allows the grip 610 to be slid onto one of the handles 660 with less resistance. Furthermore, when an adhesive is used between the handles 660 and the grips 610, the tapered opening 651 prevents the adhesive from being pushed off of the portion of the handles 660 corresponding to the grip 610.

In an embodiment with a tapered opening, a first diameter 653 of the opening, adjacent the first end 620 of the grip and similar to the diameter 53 of the golf club grip 10, can range from 0.5 to 3.0 inches. A second diameter 654 of the opening, similar to the diameter 54 of the golf club grip 10, can also range from 0.8 to 1.2 inches. For example, in some embodiments the first diameter 653 and the second diameter 654 of the opening range from 0.8-0.9, 0.9-1.0, 1.0-1.1, or 1.1-1.2 inches. In preferred embodiments, the second diameter 654 is roughly 1 inch (25.4 mm) or roughly 1.031 inch (26.0 mm). Further, in some embodiments, the front edge 652 can taper at an angle between 0.5 and 30 degrees with respect to the main portion of the bore 650. In other embodiments, the front edge 652 can taper at an angle between 0.5 and 3, 0.5 and 5, 1 and 5, 3 and 7, 5 and 9, 7 and 11, 9 and 13, 11 and 15, 13 and 17, 15 and 19, 17 and 21, 19 and 23, 21 and 25, 23 and 27, or 25 and 30 degrees. Additionally, in some embodiments, the angled front edge 652 can extend between 0.01 to 0.75 inches from at or near the first end 620 in a direction extending generally towards the second end 630. In other embodiments, the angled front edge 652 can extend between 0.01 to 0.1, 0.05 to 0.15, 0.1 to 0.2, 0.25 to 0.35, 0.3 to 0.4, 0.35 to 0.45, 0.4 to 0.5, 0.45 to 0.55, 0.5 to 0.6, 0.55 to 0.65, 0.6 to 0.7, or 0.65 to 0.75 inches from at or near the first end 620 in a direction extending generally towards the second end 630.

As illustrated in FIG. 25, an ergonomic bicycle grip 710 can comprise a bore 750 that is tapered in a manner similar to the regular bicycle grip 600 described above. The ergonomic grip 710 can comprise a first end 720 and a second end 730, located similarly to the first 620 and second 630 of the regular grip 600. The first end 720 comprises a tapered opening, similar to the tapered opening 651 of the regular grip 600. The external surface contours of the grip 710 can vary considerably from the first end 720 of the ergonomic grip to the second end 730. In other words, a cross-section of the ergonomic grip near the first end 720 can have a different shape than a cross-section near the center of the grip 710 or the second end 730 of the grip 710. The cross-sectional shape at any point on the grip 710 can take on a circular, elliptical, or other rounded shape. In the illustrated embodiment of FIG. 25, a portion of the grip 710 adjacent the second end 730 of the grip 710 can comprise a bulge. In some embodiments, a portion of the grip 710 at the second end 730 of the grip 710 comprises a bar-like end that extends forward. The tapered opening of the ergonomic grip 700 provides benefit similar to the benefits of the tapered opening of the regular grip 600.

As illustrated in FIG. 26, a bicycle grip 810 with an end guard can comprise a bore 850 that is also tapered in a manner similar to the regular bicycle grip 610 described above. The end guard grip 810 can comprise a first end 820 and a second end 830, located similarly to the first 620 and second 630 of the regular grip 610. The first end 820 comprises a tapered opening, similar to the tapered opening 651 of the regular grip 610. The first end 820 of grip 800 further comprises an end guard that has an outer diameter greater than the outer diameter of the majority of the grip 810. The disk-like end guard extending from the first end 820 of the grip 810 increases safety by preventing the rider's hand from slipping off of the grip 810 towards the center of the handlebars 603. For example, a beginner rider may be prone to losing balance and tipping the bicycle to the side such that one handle 660 impacts the ground. The momentum of the rider and the abrupt stop of the handlebars due to impact will cause the rider's hand which is furthest from the ground to slip towards the center of the handlebars. The grip 810 with end guards will help prevent the rider from losing his or her grip on the handle 660. Due to greater diameter of the end guard, the largest diameter of the tapered opening can be greater than the outer diameter of a majority of the grip 810. However, in most embodiments, the greatest diameter of the tapered opening is not greater than the outer diameter of a majority of the grip 810. The tapered opening of the end guard grip 810 provides benefits similar to the benefits of the tapered opening of the regular grip 610.

The bicycle grips 610, 710, and 810 can be inserted over a bicycle handle 660, such as is illustrated with the example grip 810 in FIG. 27. In the illustrated embodiment, the tapered opening is cross-sectionally visible after the grip is installed. In other embodiments, the tapered opening is no longer cross-sectionally visible because the material that forms the grip deforms when it slides over the handle 660.

The bicycle grips 610, 710, and 810, illustrated in FIGS. 23-27, are exemplary of three embodiments of a tapered grips for use on bicycles. Other embodiments of tapered grips for use on bicycles, stationary exercise bikes, or other types of sports equipment can incorporate grip bore shapes, dimension variations, adhesive compositions, materials, and other aspects of the tool and tapered grip as described in the general detailed description and/or in other exemplary embodiments described herein. A method of installing the grips 610, 710, or 810 onto the bicycle 600 can be similar to the method of installing a grip 10 onto a golf club shaft 160, as described above.

The invention claimed is:

1. A shaft assembly comprising:
 a shaft comprising an inner diameter and an outer diameter;
 a grip;
 an adhesive configured to permanently couple the shaft and the grip;
 the grip comprising:
 a tubular body including an internal bore extending from an open first end to a capped second end, and a body outer diameter which tapers at a constant rate from the first open end to the capped second end;
 the internal bore defining a length measured from the open first end to the capped second end and a diameter;
 wherein, the open first end comprises an internal tapered edge having a greatest diameter at an exterior of the open first end and tapers at an angle between 0.5 degrees and 5 degrees for a distance of up to 0.5 inches towards an interior of the internal bore and wherein the greatest diameter is spaced from the body outer diameter at the first open end;
 wherein the diameter of the internal bore varies linearly along the internal tapered edge;
 wherein the diameter of the internal bore is constant across a remaining portion of the length of the internal bore;
 wherein the tubular body comprises a single layer comprising a synthetic rubber material;
 wherein the adhesive extends between the shaft and the grip along a majority of the length of the internal bore;
 wherein an amount of adhesive decreases from proximate the open first end to proximate the capped second end; and
 the outer diameter including the adhesive remains constant across a portion of the shaft received by the internal bore.

2. The shaft assembly of claim 1, wherein the open first end tapers at an angle of 3 degrees for a distance of 0.125 inches in a direction extending from an opening towards the interior of the internal bore.

3. The shaft assembly of claim 1, wherein:
 the internal bore at the open first end comprises a first diameter;
 the internal bore comprises a second diameter measured between the internal tapered edge and the capped second end of the tubular body of the grip;
 the first diameter is greater than the second diameter; and
 the first diameter is between 0.3 inches and 0.9 inches.

4. The shaft assembly of claim 3, wherein the second diameter is at least 0.3 inches.

5. The shaft assembly of claim 1, wherein:
 the grip is configured to be received onto the shaft;
 the shaft is engaged with a piece of equipment selected from the group consisting of: a hand tool, a garden tool, a woodworking tool, a construction tool, a handheld piece of sports equipment, a stationary sports equipment apparatus, a piece of hunting equipment, and a bicycle.

6. A golf club shaft assembly comprising:
 a shaft comprising an inner diameter and an outer diameter;
 a tape layer configured to permanently couple to at least a portion of the shaft and a grip;
 the grip comprising:
 a tubular body including an internal bore extending from an open first end to a capped second end, and a body outer diameter which tapers at a constant rate from the first open end to the capped second end;
 the internal bore defining a length measured from the open first end to the capped second end and a diameter;
 wherein:
 the open first end comprises an internal tapered edge having a greatest diameter at an exterior of the open first end and tapers at an angle between 0.5 degrees and 5 degrees for a distance of up to 0.5 inches towards an interior of the internal bore, and wherein the greatest diameter is spaced from the body outer diameter at the first open end;
 the grip is configured to cover the tape layer, coupling the grip to the shaft;
 wherein the diameter of the internal bore varies linearly along the internal tapered edge;
 wherein the diameter of the internal bore is constant across a remaining portion of the length of the internal bore;
 wherein the tubular body comprises a single layer comprising a synthetic rubber material; and
 wherein the tape layer extends between the shaft and the grip along a majority of the length of the internal bore;
 wherein the tape layer comprises multiple wrapped layers that increase in number from proximate the capped second end to proximate the open first end; and the outer diameter including the tape layer remains constant across the portion of the shaft revied by the internal bore.

7. The golf club shaft assembly of claim 6 wherein:
the shaft further comprises a tip end and a butt end;
the outer diameter of the shaft increases from the tip end to the butt end.

8. The golf club shaft assembly of claim 7 wherein the tape layer extends from adjacent the butt end to adjacent the open first end of the grip.

9. The golf club shaft assembly of claim 7 wherein:
the tape layer is thickest adjacent the open first end of the grip; and
the tape layer terminates at the open first end of the grip.

10. The golf club shaft assembly of claim 7, wherein:
the internal bore of the grip comprises a uniform inner diameter between the internal tapered edge and the capped second end of the grip;
a varying shaft outer diameter and the uniform inner diameter of the internal bore of the grip create a tapered gap between the shaft and the grip; and
the tape layer fills the tapered gap.

11. The golf club shaft assembly of claim 6, wherein the tape layer comprises between one and seven wrapped layers of tape.

* * * * *